United States Patent [19]

Lin

[11] Patent Number: 5,733,031
[45] Date of Patent: Mar. 31, 1998

[54] OPTICAL REARVIEW DEVICE OF VEHICLE

[76] Inventor: Chung Yu Lin, 29, Tunnel 152, Kuang Hwa 1 Road, Kaohsiung, Taiwan

[21] Appl. No.: 474,720

[22] Filed: Jun. 7, 1995

[51] Int. Cl.$^6$ .................................................. B60Q 1/24
[52] U.S. Cl. ........................ 362/83.3; 362/61; 362/326
[58] Field of Search ................... 362/61, 83.3, 308, 362/326, 327, 328, 330; 340/435

[56] References Cited

U.S. PATENT DOCUMENTS

| | | | |
|---|---|---|---|
| 4,941,263 | 7/1990 | Hirshberg | 340/435 X |
| 5,504,480 | 4/1996 | Bourbin | 362/61 X |

*Primary Examiner*—Stephen F. Husar
*Attorney, Agent, or Firm*—David & Raymond; Raymond Y. Chan

[57] ABSTRACT

The present invention relates to an optical rearview device installed in the rear part of an vehicle. The optical rearview device of vehicle comprises a light emitting source and a lens set which is mounted in from of the light emitting source. The limit emitting source continuously emits a high intensity incident ray, such as laser ray, falling on to the lens set when the vehicle reverses. The lens set comprises a projecting lens having a light incident plane. A predetermined angle is provided between the light incident plane and the incident ray. The projecting lens reflects and refracts the incident ray which falls on the light incident plane thereof to form at lease two projecting beams. The two high intensity projecting beams projected from the lens set strike an object behind the vehicle to form at least two light spots on the object during reversing the vehicle. Such distance among the light spots on the object are proportional to the distance between the object and the vehicle. Thus, the distance between the object and the vehicle can be determined accurately and easily by observing the distance varying among the light spots on the object behind the vehicle.

5 Claims, 9 Drawing Sheets

OPTICAL REARVIEW DEVICE OF VEHICLE

BACKGROUND OF THE PRESENT INVENTION

The present invention relates to an auxiliary rearview device of vehicle, and more particularly to an optical rearview device which is installed in the rear part of a vehicle and emits at least two high intensity incident beams to strike any object behind the vehicle to form light spots on the object during reversing the vehicle. Such distance among the light spots on the object are proportional to the distance between the object and the vehicle. Thus, the distance between the object and the vehicle can be determined accurately and easily by observing the distance varying among the light spots on the object behind the vehicle.

The conventional method to determine the distance between a vehicle and an object, such as another vehicle, behind the vehicle during reversing or parking is to observe through a rearview mirror of the vehicle. Since the rearview mirror can only provide a planar image of the object, a driver must determine the distance between the vehicle and the object by the driver's judgment of the object's size as appearing in the rearview mirror based on the driver's own experience. Most of the drivers find that it is very difficult to rely on the rearview mirror during parallel parking and reversing the vehicle into a narrow space. Accordingly, it is quite common to impact upon the object behind the vehicle due to false determination of the distance between the vehicle and the object while parallel parking or reversing into a narrow space. The only solution is to waste a lot of time in repeating the forwarding and reversing movement of the vehicle in order to reduce the opportunity of false determination.

SUMMARY OF THE PRESENT INVENTION

The main object of the present invention is to provide an optical rearview device of vehicle which can facilitate controlling and operating an vehicle during reversing the vehicle by providing at least two high intensity incident beams to strike an object behind the vehicle to form at least two light spots on the object during reversing the vehicle. Such distance among the light spots on the object are proportional to the distance between the object and the vehicle. Thus, the distance between the object and the vehicle can be determined accurately and easily by observing the distance varying among the light spots on the object behind the vehicle.

Accordingly, the present invention provides an optical rearview device installed in the rear part of an vehicle. The optical rearview device of vehicle comprises a light emitting source and a lens set which is mounted in front of the light emitting source. The light emitting source continuously emits a high intensity incident ray, such as laser ray, falling on to the lens set when the vehicle reverses. The lens set comprises a projecting lens having a light incident plane. A predetermined angle is provided between the light incident plane and the incident ray. The projecting lens reflects and refracts the incident ray fallen on the light incident plane thereof to form at lease two projecting beams. The two high intensity projecting beams projected from the lens set strike an object behind the vehicle to form at least two light spots on the object during reversing the vehicle. Such distance among the light spots on the object are proportional to the distance between the object and the vehicle. Thus, the distance between the object and the vehicle can be determined accurately and easily by observing the distance varying among the light spots on the object behind the vehicle.

DETAILED DESCRIPTION OF THE PREFERRED EMBODIMENT

Figure 1:
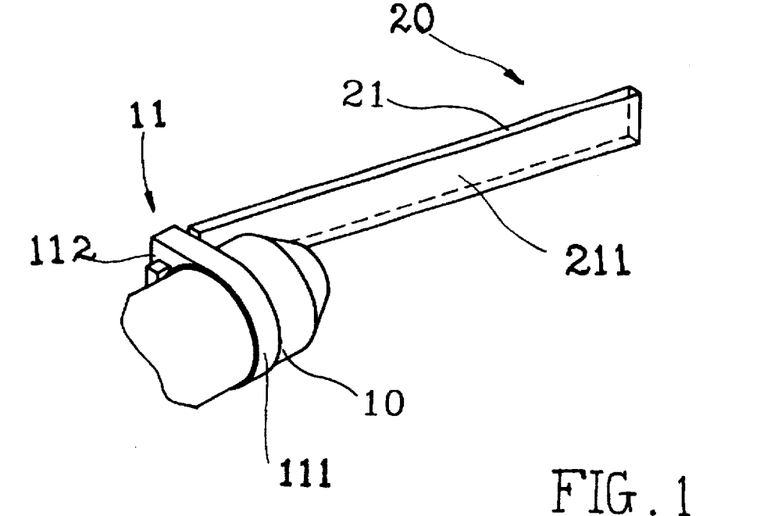
FIG. 1 is a three-dimensional view of an optical rearview device according to a first embodiment of the present invention.
Figure 2:
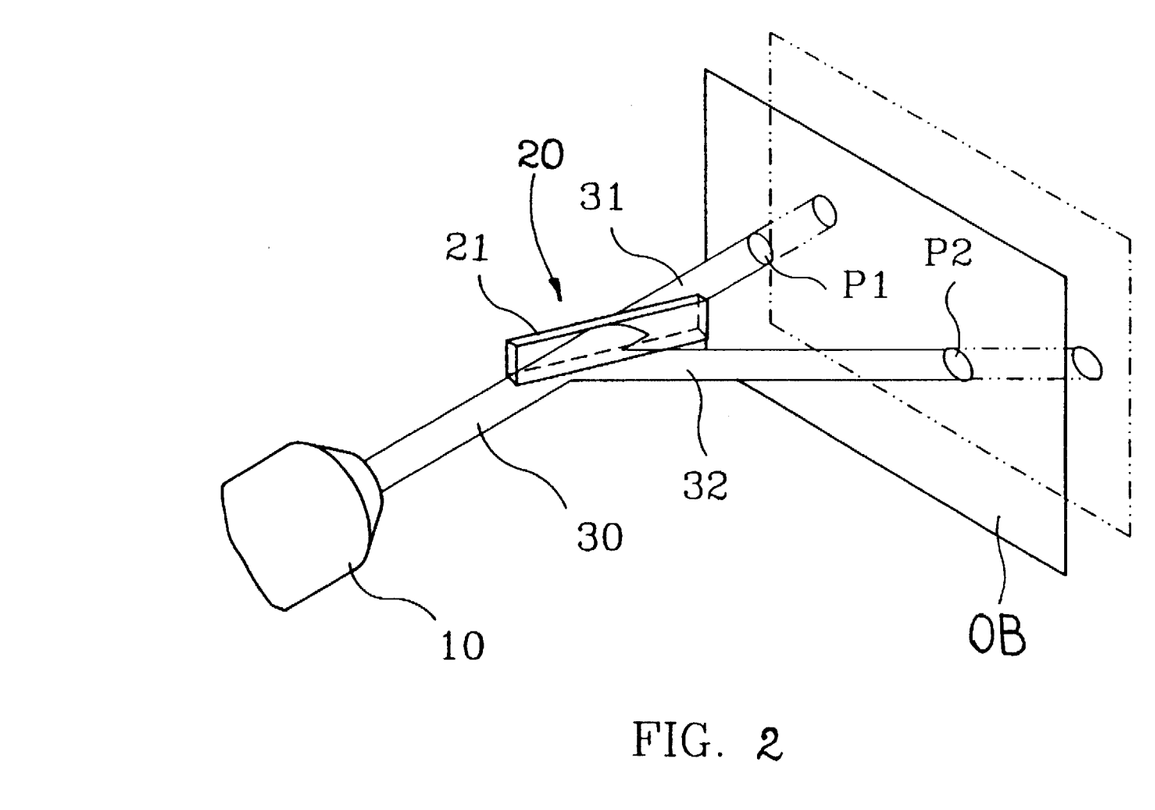
FIG. 2 is a schematic view of the above first embodiment of the present invention, illustrating the reflecting and refracting of beams.

FIG. 1 and 2 illustrate an optical rearview device of a first preferred embodiment of the present invention. The optical rearview device, installed in the rear part of an vehicle, comprises a light emitting source 10 and a lens set 20 which is mounted in front of the light emitting source 10 by means of a mounting seat 11. The light emitting source 10 is a tubular laser generator which provides a high intensity laser incident ray 30. The lens set 20, pursuant to the first embodiment, comprises a rectangular projecting lens 21 which has a front light incident plane 211 disposed in a predetermined incident angle with the incident ray 30 from the light emitting source 10.

The mounting seat 11 comprises a holding ring 111 which provides a holder 112 on one edge thereof. The holding ring 111 is clamped on an emitting end of the light emitting source 10. The holder 112 firmly holds the projecting lens 21 in a slant position by engaging one end of the projecting lens 21 with the holder 112. The preferable angle between the projecting lens 21 and the incident ray 30 from the light emitting source is less than 22.5 degree. The power source of the light emitting source 10 is connected to the power input of a reverse light of the vehicle (not shown in drawings). Thus, the light emitting source 10 can continuously emit the incident ray 30 which falls on to the slant light incident plane 211 of the projecting lens 20 when the vehicle reverses. As shown in FIG. 2, portion of the incident ray 30 penetrates the projecting lens 21 and is refracted to form a refracted beam 31. Portion of the incident ray 30 is reflected by the light incident plane 211 to form a reflected beam 32. The refracted beam 31 is parallel to the path of the incident ray 30. The thickness of the projecting lens 21 can be adjusted to render the refracted beam 31 coinciding with the path of the incident ray 30 and the reflected beam 32 forming a predetermined angle with the incident ray 30.

When the refracted and reflected beams 31, 32 projected from the projecting lens 21 cast onto an object OB, such as another vehicle or a wall, behind the vehicle during reversing the vehicle, two light spots P1, P2 are formed correspondingly on the object OB. Such distance among the light spots P1, P2 on the object OB is proportional to the distance between the object OB and the lens set 20, that is the rear part of the vehicle. Thus, when the vehicle reverses or back up, the two light spots P1, P2 will approach each other. The distance between the object OB and the vehicle can be judged or determined accurately and easily by observing the distance varying among the light spots P1, P2 on the object OB behind the vehicle in a rearview mirror of the vehicle (as illustrated by the dotted line in FIG. 2).

Figure 3:
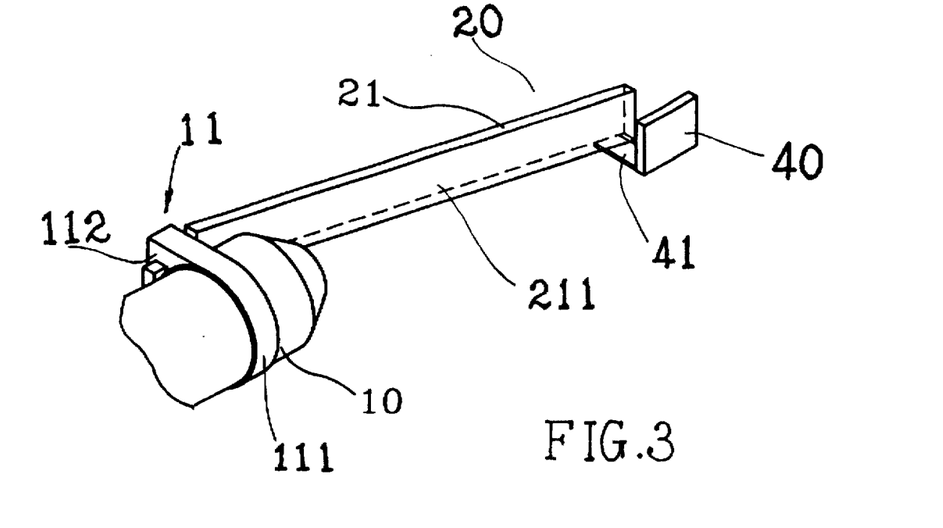
FIG. 3 is a three-dimensional view of an optical rearview device according to a second embodiment of the present invention.
Figure 4:
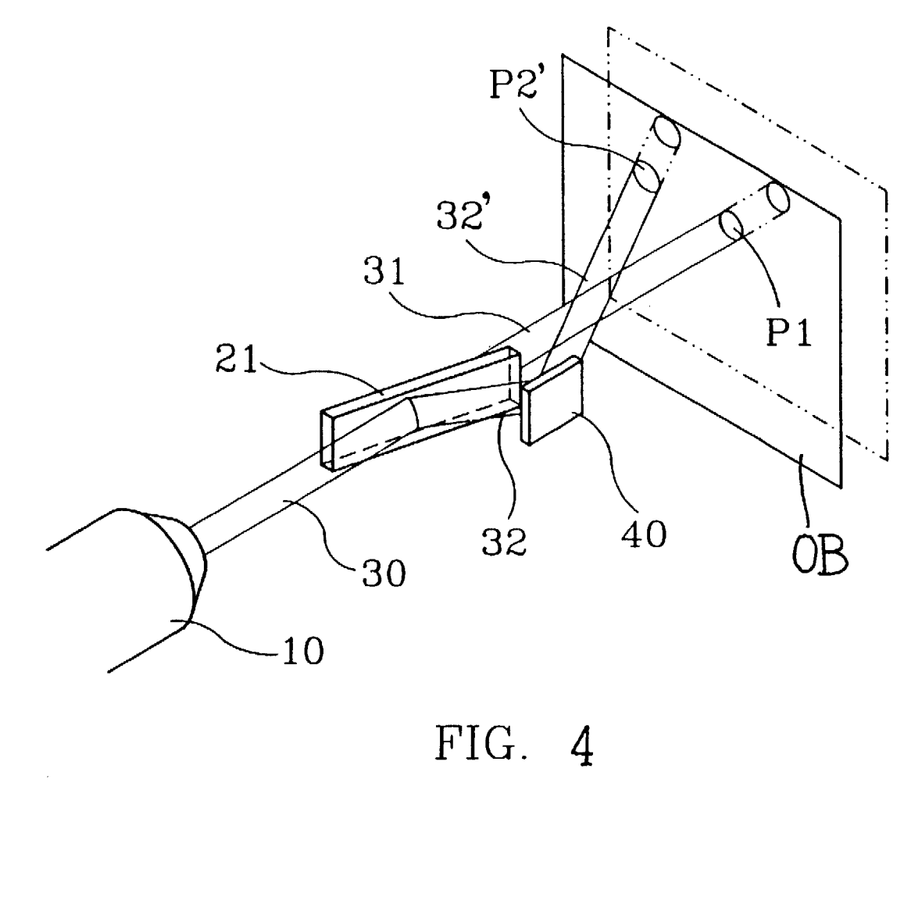
FIG. 4 is a schematic view of the above second embodiment of the present invention, illustrating the reflecting and refracting of beams.
Figure 5:
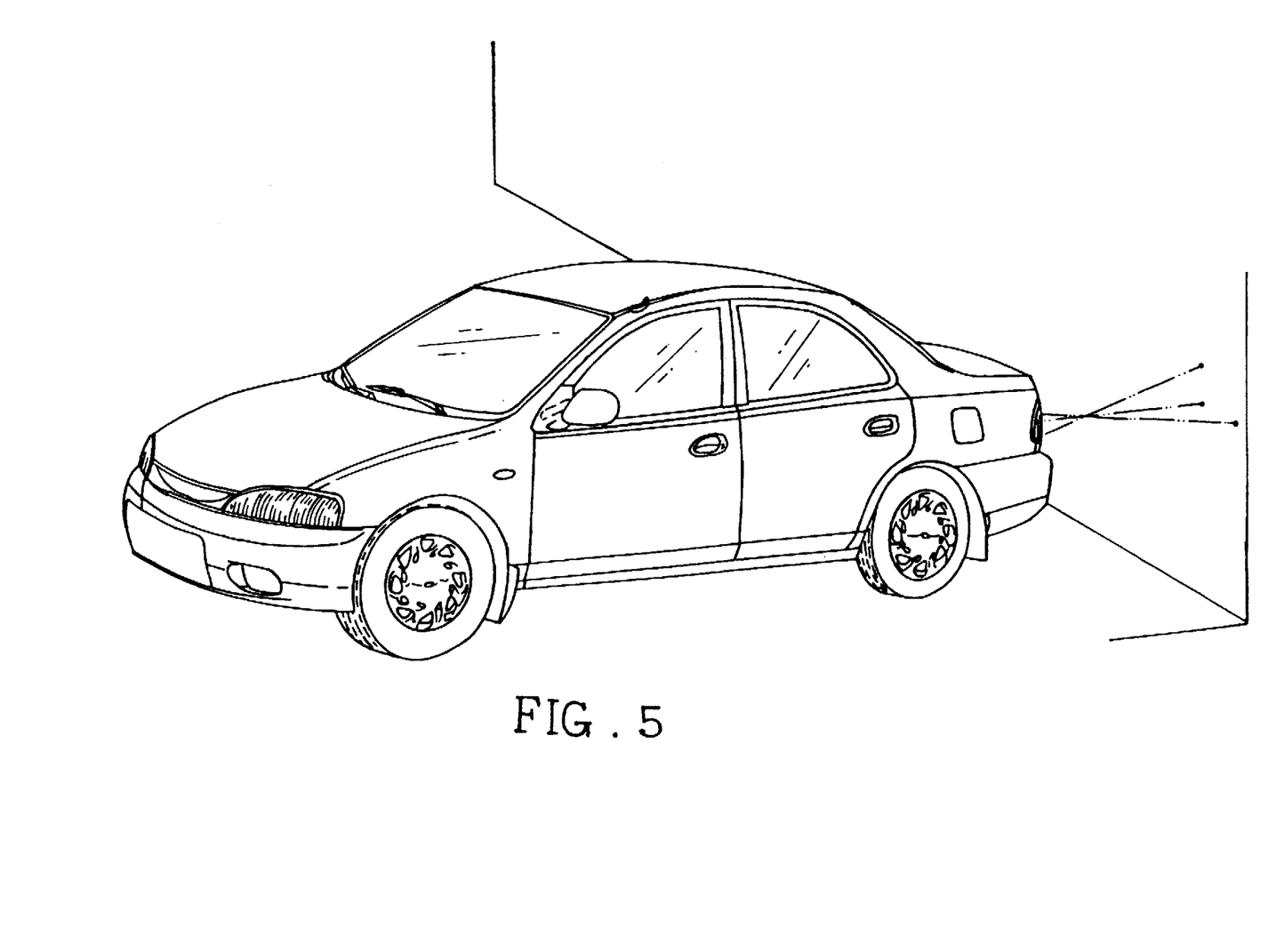
FIG. 5 is a perspective view of an vehicle installed with the above second embodiment of the present invention, illustrating the beams emitted from the optical rearview device falling on a wall behind the vehicle.

Referring to FIG. 3, 4 and 5, a second embodiment of an optical rearview device of the present invention is illustrated. It comprises all the elements and features of the above first embodiment. The lens set 20 further comprises a reflector 40 mounted adjacent to a second end of the projecting lens 21 by means of a supporter 41 (as shown in FIG. 3). The supporter 41 is attached to both the bottoms of the projecting lens 21 and the reflector 30. The reflector 40 is positioned along the path of the reflected beam 32 and at a predetermined angle with the reflected beam 32. As shown in FIG. 4, the reflected beam 32 is then further reflected by the reflector 40 to form a secondary reflected beam 32' which crosses the path of the refracted beam 31. The secondary reflected beam 32' and the refracted beam 31 cast onto the object OB behind the vehicle to form a light spot P2 and the light spot P1. Thus, when the two light spots P1, P2, are observed coming together at one point, it should be understood that the vehicle is very closed to the object OB (as shown in FIG. 5). Such optical rearview device greatly facilitates the driver's judgment of the distance between the vehicle and the object OB behind when the driver is backing up or reversing the vehicle.

Figures 6, 7:
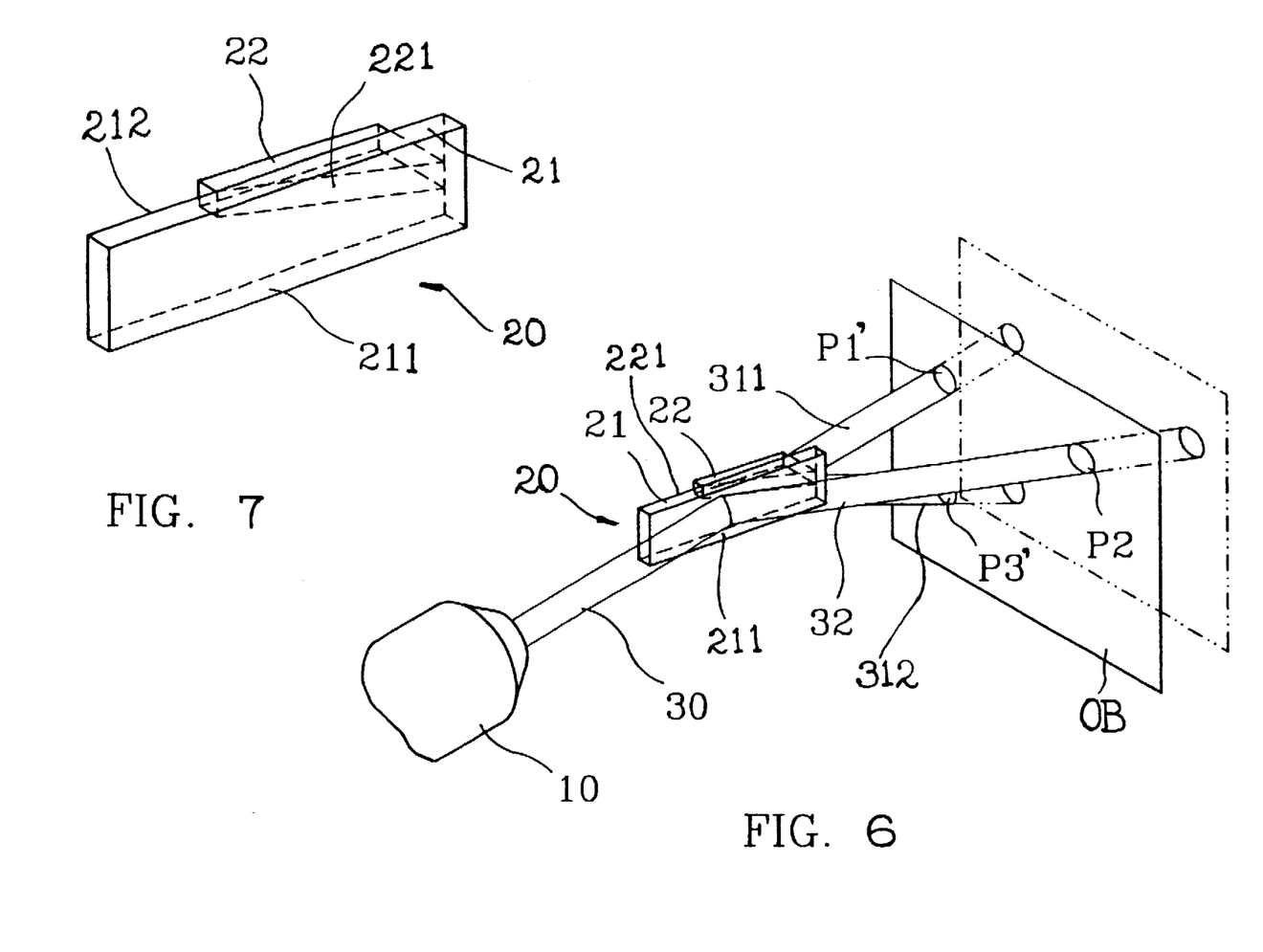
FIG. 6 is a schematic view of an optical rearview device according to a third embodiment of the present invention, illustrating the reflecting and refracting beams.
FIG. 7 is a perspective view of the lens set of the above third embodiment of the present invention.

FIG. 6 and 7 illustrate a third embodiment of an optical rearview of the present invention which comprises all the elements of the above first embodiment. In which the lens set 20 further comprises an incident lens 22. The incident lens 22 is a triangular lens and is attached to a back plane 212 of the projecting lens 21. The incident lens has a inclined plane 221 facing to the back plane 212 of the projecting lens 21. There is a predetermined angle formed between the inclined plane 221 and the back plane 212. When the incident ray 30 from the light emitting source 10 falls on the projecting lens 21, it is split into the refracted beam 31 and reflected beam 32. When the refracted beam 31 falls on the incident lens 22, portion of the refracted beam 31 penetrates the incident lens 22 and is refracted to form a projecting refracted beam 311. Portion of the refracted beam 31 is reflected by the inclined plane 221 of the incident lens 22 to form a projecting reflected beam 3 12. The effect of the incident lens 22 to the refracted beam 31 is similar to the effect of the projecting lens 21 to the incident ray 30.

When the projecting refracted beam 311, the projecting reflected beam 312, and the reflected beam 32 cast onto the object OB behind the vehicle, three light spots P1', P2, and P3' appear on the object OB. If the projecting refracted beam 311 is projected on a planar surface of the object OB as a center spot, it is preferable to project the projecting reflected beam 312 or the reflected beam 32 on a horizontal vector or a vertical vector of the center light spot P1' to form the light spots P3' and P2. In which the horizontal distance between the light spot P2 and the center light spot P1' is preferably equal to the vertical distance between the light spot P3' and the center light spot P1'. The distance between any two light spots can be observed and used by the driver of the vehicle to judge the distance between the vehicle and the object OB behind the vehicle.

The projecting lens 21 is positioned vertically and forms an angle less than 22.5 degree with the incident ray 30. It should be understood that the projecting lens 21 can also be positioned above or below the light emitting source 10 forming an angle with the incident ray 30 while the incident lens 22 is placed vertically on top of the projecting lens 21. Therefore, the intersection of the incident lens 22 and the projecting refracted beam 311 is behind the intersection of the projecting lens 21 and the incident ray 30. For the best effect, the angle between the incident lens 22 and the projecting refracted beam 311 should be equal to the angle between the projecting lens 21 and the incident ray 30. Thus, by varying the arrangement of lenses of lens set 20, the incident ray 30 emitted from the light emitting source 10 can be split into multiple beams. When such multiple beams cast onto an object behind the vehicle, a plurality of light spots appear on the object. The distance varying between any two light spots is used to judge the distance between the vehicle and the object.

Figures 8, 9:
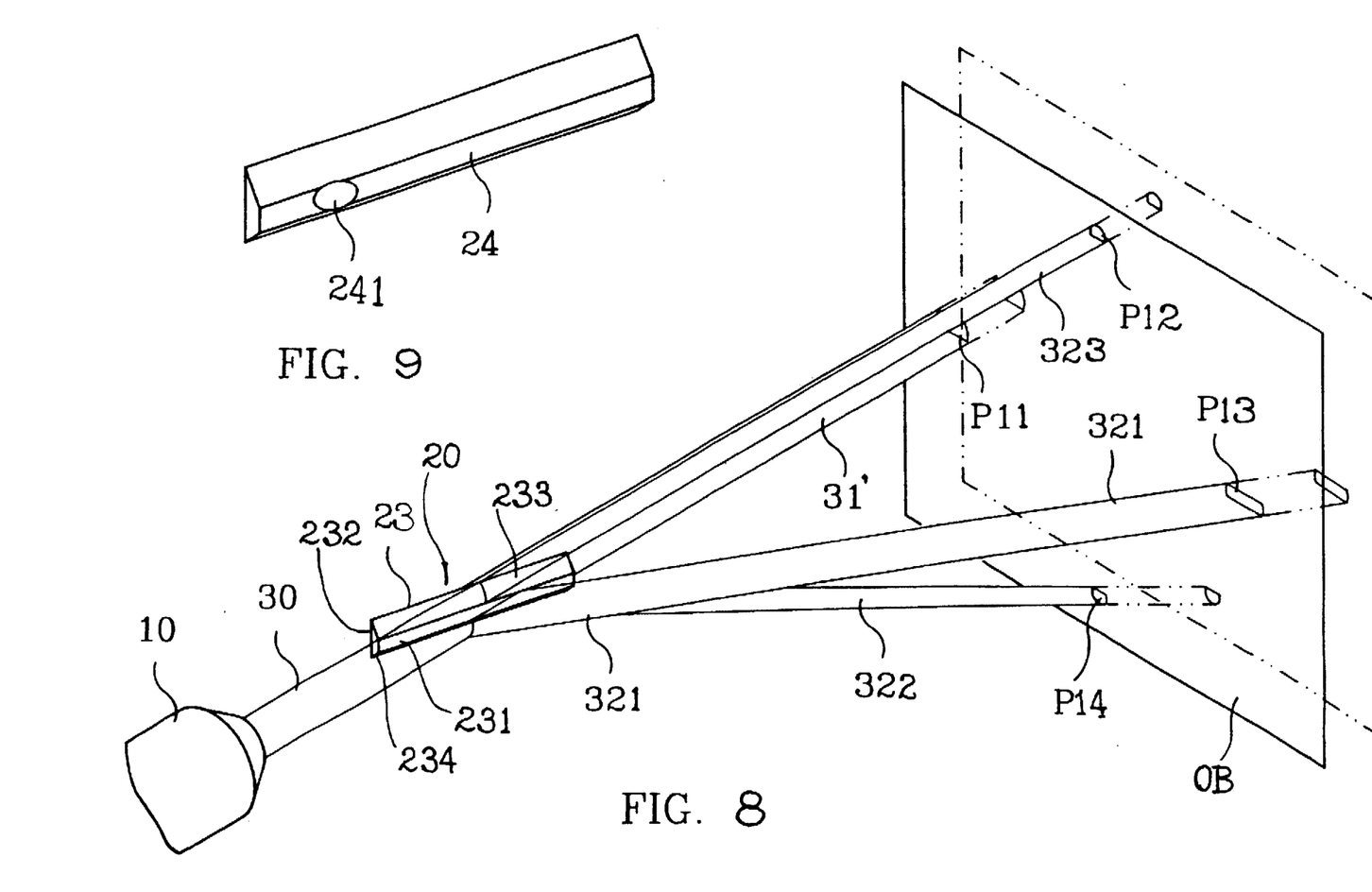
FIG. 8 is a schematic view of an optical rearview device of a fourth embodiment of the present invention.
FIG. 9 is a perspective view of a polygonal lens having a small hole of the above fourth embodiment of the present invention.

FIG. 8 illustrates an optical rearview device according to a fourth embodiment of the present invention. The optical rearview device, installed in the rear part of an vehicle, comprises a light emitting source 10 and a lens set 20 which is mounted in front of the light emitting source 10 by means of a mounting seat as disclosed in the above first embodiment. The light emitting source 10 is a tubular laser generator which provides a high intensity laser incident ray 30. The lens set 20, pursuant to this fourth embodiment, comprises a polygonal lens 23 which has a polygonal cross section or described as a prism. The polygonal lens 23 is positioned to form an angle with the incident ray 30 emitted from the light emitting source 10. The polygonal lens 23 pursuant to the fourth embodiment has a trapezoidal cross section with each of the two basal angles equal to 45 degree and thus comprises two parallel incident planes 231, 232 and two incident inclined planes 233, 234. The incident ray 30 falls on all planes 231, 232, 233, and 234.

Accordingly, a portion of the incident ray 30, which is emitted from the light emitting source 10 and falls on the front nincident plane 23 1 of the polygonal lens 23, penetrates the polygonal lens 23 and forms a refracting beam 31' projecting from the parallel back incident plane 232 to an object OB behind the vehicle. The refracting beam 31' is parallel to the incident ray 30. Other portions of the incident ray 30 falling on the front incident plane 231 and the two inclined incident planes 233, 234 of the prism lens 23 are reflected respectively to form three reflecting beams 321, 322, and 323. When the refracting beam 31' and the three reflecting beams 321, 322, and 323 cast onto the object OB, four light spots P11, P12, P13, and P14 appear on the object OB and occupy the four corners of a square. The distance varying among the light spots P11, P12, P13, P14 can be used to judge the distance between the vehicle and the object OB.

When the cross section of the polygonal lens 23 is an equilateral polygon, the light spots P11, P12, P13, and P14 formed by the refracting beam 31' and the reflecting beams 321, 322, 323 will draw the shape of an equilateral polygon. When the vehicle is back up, the light spots P11, P12, P13, and P14 will gradually come together and the driver of the vehicle can observed the distances among the light spots P11, P12, P13, P14 in a rearview mirror of the vehicle to judge the distance between the vehicle and the object OB behind.

The polygonal lens 23 can be coated with a light reflecting material on all its incident planes 231, 232, 233, 234 to become a polygonal reflector 24 that the incident ray 30 does not penetrate the front incident plane 231 and back incident plane 232. Under such arrangement, the polygonal lens 23 does not refract the incident ray 30 from the light emitting source 10, and thus the light spot P11 will not appear on the object OB. Only light spots P12, P13, and P14 and so forth resulted from various reflecting beams are available for determining the distance between the vehicle and the object OB. However, the light spot P11 can be preserved by providing the coated polygonal reflector 24 with a small hole 241 on the path of the axis of the incident ray 30, as shown in FIG. 9. The diameter of the hole 241 is smaller than the diameter of the incident ray 30 in order to allow only portion of the incident ray 30 to pass through the polygonal reflector 24.

Figures 10, 11:
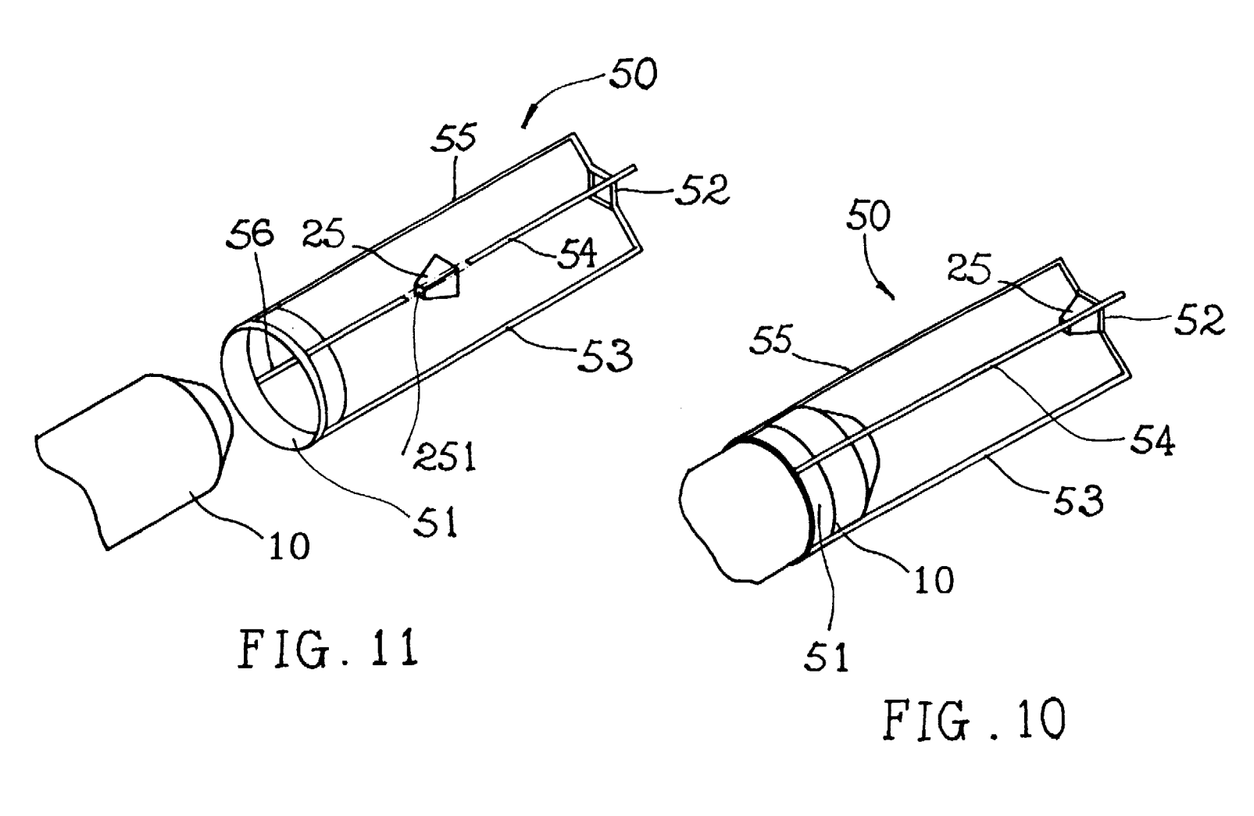
FIG. 10 is a three-dimension view of an optical rearview device of a fifth embodiment of the present invention.
FIG. 11 is a exploded view of the above fifth embodiment of the present invention.
Figure 12:
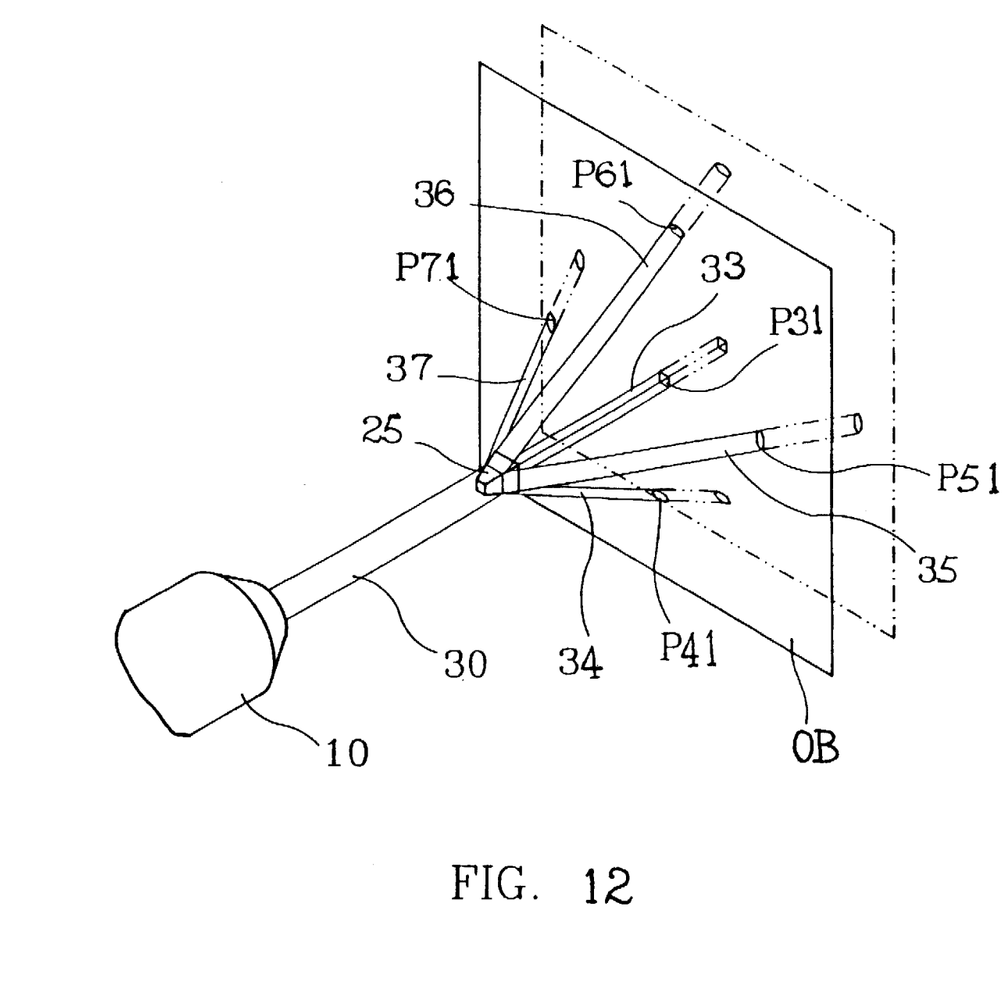
FIG. 12 is a schematic view of the above fifth embodiment of the present invention, illustrating the reflecting and refracting beams.

Referring to FIG. 10, 11, and 12, an optical rearview device of a fifth embodiment of the present invention is illustrated. The optical rearview device, installed in the rear part of an vehicle, comprises a light emitting source 10 and a lens set 20 which is mounted in front of the light emitting source 10 by means of a mounting seat 40. The light emitting source 10 is a tubular laser generator which provides a high intensity laser incident ray 30. The lens set 20, pursuant to this fifth embodiment, comprises a prism lens 25 with a flat-top 251 and has all its side incident planes except the top and bottom coated with a light reflecting material. The incident area of the incident ray 30 covers the whole area of the top portion of the lens 25. The axis of the incident ray 30 from the light emitting source 10 coincides with the axis of the prism lens 25 extending through the centers of the top and bottom planes of the flat-top prism lens 25. The mounting seat 50 comprises a base ring 51 clamped on an emitting end of the light emitting source, a lens holder 52, and four ribs 53, 54, 55, 56 extended from the base ring 51 parallelly to connect with the lens holder 52 which is a square frame for holding the prism lens 25 firmly in position, as shown in FIG. 10.

As shown in FIG. 12, when the incident ray 30 emitted from the light emitting source 10 falls on to the prism lens 25, a portion of the incident ray 30 penetrates and passes through the axis of the flat-top prism lens 25 to form a center beam 33. Other portion of the incident ray 30 is reflected by the coated side incident planes of the prism lens 25 to form a plurality of reflected beams 34, 35, 36, and 37. The quantity of the reflected beams depends on the number of angles in the cross section of the prism lens 25.

A light spot P31 is formed when the center beam 33 falls onto the surface of an object OB behind the vehicle. Similarly, a plurality of light spots P41, P51, P61, P71 are formed when the reflected beams 34, 35, 36, 37 fall onto the surface of the object OB. Therefore, the light spot P31 falls on the center of a circle and the fight spots P41, P51, P61, P71 fall on the circumference of the circle. By observing the distance between the central light spot P31 or the other light spots P41, P51, P61, P71 or the distance between different light spots, the distance between the vehicle and the object OB can be judged easily and accurately.

Theoretically, when the number of angles in the cross section of the prism lens 25 approaches infinity and thus the prism lens 25 becomes a circular flat-top cone, the light spots formed by the plurality of reflected beams will appear as a light ring. When the vehicle gets closer to the object, the size of this light ring will shrink.

Figure 13:
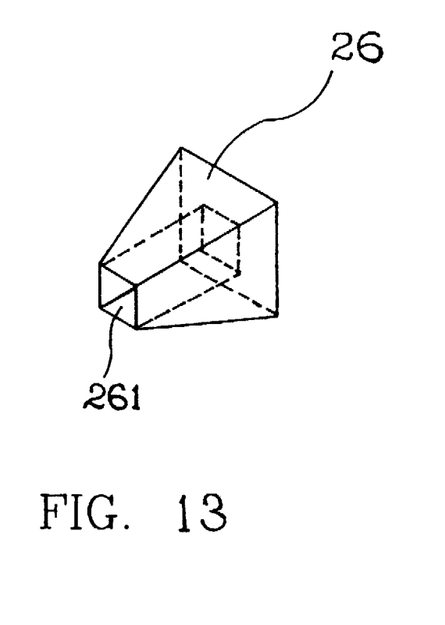
FIG. 13 is an isometric view of a prism lens with a flat-top of the present invention.

As shown in FIG. 13, an alternative coated prism lens 26 with an axial hole 261 is illustrated. It can be used instead of the lens 25 in the above fifth embodiment, in which portion of the incident ray 30 passes through the axial hole 261 and falls on to the object OB to form the light spot P31.

Figure 14:
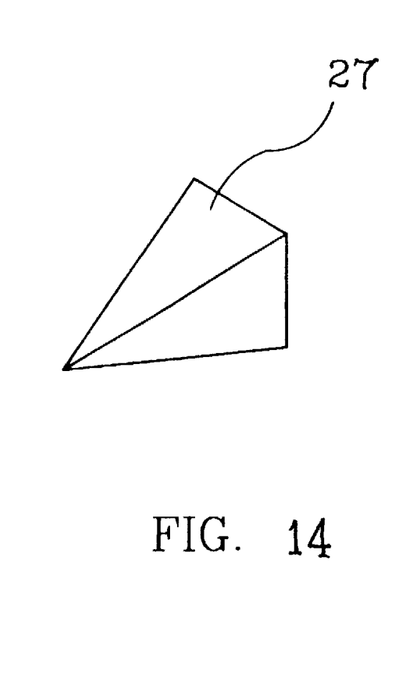
FIG. 14 is an isometric view of a pointed prism lens of the present invention.

Referring to FIG. 14, a pointed prism lens 27 is shown which can be utilized in the above fifth embodiment instead of the flat-top prism lens 25. All the side incident planes of the pointed prism lens 27 is covered with a light reflecting material, the incident ray 30 cannot pass through the pointed prism lens 27 and the central light spot P31 will not appear on the object OB. Under this arrangement, the distance between the vehicle and the object can also be determined by observing the other light spots on the object.

According to the abovementioned embodiments of the present invention, the optical rearview device can be installed in the rear bumper, the rearlight, the reverse light, or the trunk of a vehicle to provide at least two laser beams stalking rearwardly onto any object behind the vehicle duing reversing.

I claim:

1. An optical rearview device, which is installed in a rear part of a vehicle, comprising a light emitting source and a lens set mounted in front of said light emitting source, said light emitting source emitting a high intensity incident ray when said vehicle is backing, said lens set comprising a projecting lens having at least a light incident plane positioned in a predetermined incident angle with said incident ray emitted from said light emitting source, wherein a portion of said incident ray penetrating said projecting lens and being refracted to form a refracted beam which is parallel to said incident ray, another portion of said incident ray being reflected off said incident plane of said projecting lens to form a reflected beam, whereby at least two light spots are formed correspondingly on an object behind said vehicle when said refracted and reflected beams projected from said projecting lens are cast onto said object when said vehicle is backing, a distance between said object and said vehicle being able to be judged and determined.

2. An optical rearview device as recited in claim 1 further comprising a mounting seat for holding said lens set in front of said light emitting source, said mounting seat comprising a holding ring clamped on an emitting end of said light emitting source, a holder provided on one edge of said holding ring for firmly holding said projecting lens in a slant position by engaging one end of said projecting lens with said holder.

3. An optical rearview device as recited in claim 1 wherein said incident angle between said light incident plane of said projecting lens and said incident ray emitted from said light emitting source is less than 22.5 degree.

4. An optical rearview device as recited in claim 1 wherein said projecting lens is a rectangular lens with a predetermined thickness.

5. An optical rearview device as recited in claim 1 wherein said lens set further comprises a reflector mounted adjacent to said projecting lens, said reflector being positioned along a path of said reflected beam and having a predetermined angle with said reflected beam, said reflected beam reflected off from said projecting lens being further reflected off said reflector to form a secondary reflected beam which crosses a path of said refracted beam, so that when said refracted beam and said secondary reflected beam are cast onto said object behind said vehicle, two light spots are formed correspondingly on said object, whereby when said two light spots are overlapped at one point, said vehicle is very close to said object behind said vehicle.

* * * * *